(12) United States Patent
Haaf et al.

(10) Patent No.: US 9,282,723 B2
(45) Date of Patent: Mar. 15, 2016

(54) CAT SCRATCHING DEVICE

(75) Inventors: David Haaf, San Rafael, CA (US); Sara Paculdo, San Francisco, CA (US)

(73) Assignee: Worldwise, Inc., Novato, CA (US)

( * ) Notice: Subject to any disclaimer, the term of this patent is extended or adjusted under 35 U.S.C. 154(b) by 979 days.

(21) Appl. No.: 13/102,935

(22) Filed: May 6, 2011

(65) Prior Publication Data
US 2012/0279458 A1 Nov. 8, 2012

(51) Int. Cl.
*A01K 15/02* (2006.01)

(52) U.S. Cl.
CPC .................... *A01K 15/024* (2013.01)

(58) Field of Classification Search
CPC .................................................. A01K 15/024
USPC ................... 119/702, 706; D30/160
See application file for complete search history.

(56) References Cited

U.S. PATENT DOCUMENTS

| | | | | |
|---|---|---|---|---|
| D236,140 S | * | 7/1975 | Whitlock | D30/158 |
| D238,792 S | * | 2/1976 | White | D30/158 |
| D254,813 S | * | 4/1980 | Kossar | D30/158 |
| D254,814 S | * | 4/1980 | Kossar | D30/158 |
| D254,815 S | * | 4/1980 | Kossar | D30/158 |
| D269,821 S | * | 7/1983 | Hurley | D30/160 |
| D295,088 S | * | 4/1988 | O'Rourke | D30/160 |
| 4,790,265 A | * | 12/1988 | Manson | 119/706 |
| D334,254 S | * | 3/1993 | Mitchell | D30/160 |
| D348,124 S | * | 6/1994 | O'Rourke et al. | D30/160 |
| D370,093 S | * | 5/1996 | DeLuca | D30/160 |
| D610,313 S | * | 2/2010 | Sicken et al. | D30/108 |
| 7,867,143 B2 | * | 1/2011 | Fenger-Eriksen | 482/35 |
| 2003/0221628 A1 | * | 12/2003 | Leon | 119/28.5 |
| 2006/0191490 A1 | * | 8/2006 | Lamstein et al. | 119/706 |
| 2008/0282987 A1 | * | 11/2008 | Ritchey | 119/28.5 |
| 2009/0188439 A1 | * | 7/2009 | Simpson et al. | 119/706 |

* cited by examiner

*Primary Examiner* — David Parsley
(74) *Attorney, Agent, or Firm* — Bay Area Technology Law Group PC

(57) ABSTRACT

A cat scratching device for residing upon a substantially horizontal surface. The device includes three scratching posts each having first and second ends, the scratching posts being separated from one another at their first ends and joined to one another at their second ends resulting in a three-legged self supporting device. Each of the three scratching posts have scratching surfaces applied thereto.

6 Claims, 2 Drawing Sheets

CAT SCRATCHING DEVICE

TECHNICAL FIELD

The present invention is directed to a cat scratching device and particularly to a device which is ideally suited to be self supporting and provide multiple scratching surfaces to an engaging cat. The device is easy to construct and inexpensive to maintain and is thus ideally suited for use by domestic cat owners.

BACKGROUND OF THE INVENTION

It is quite important for the health and well being of a pet to not only feed it properly but to also provide stimulating activities. Pets which become bored often times become destructive not only of their surroundings but also of themselves. Animals which are not appropriately stimulated can actual suffer adverse health effects and as a consequence, proper pet stimulation is a significant consideration for virtually all pet owners. In addition to pet stimulation, generally, pet cats require rather unique amusement devices not shared by other domestic pets. Specifically, cats require, among other things, surfaces upon which they can scratch. If an appropriate cat scratching surface is not provided, cats will use any available surfaces including upholstered furniture, drapes and rugs to satisfy their need to scratch which could cause significant damage.

There have been a variety of cat scratching devices available in the marketplace for quite some time. The most successful of such devices have surfaces which will eventually be worn out requiring replacement. Such surfaces include, for example, carpets, sisal, corrugated cardboard, seagrass and rope. Most such devices are in the form of a uniform surface or singular post or upright member which is clad with a scratching surface. These devices can often times be tipped from their upright position causing damage to them, their surroundings as well as potentially to the engaging cat. This can occur as a cat fully engages the scratching surface and begins rough housing as a consequence.

Another limitation adherent in prior art scratching devices is that being of a singular nature, they can often times fail to adequately stimulate the cat as the cat may become bored and disinterested in scratching upon such a singular surface. Such surfaces can abrade over time and eventually either represent a hazard to the engaging cat or fail to impose the appropriate scratching medium thus requiring disposal.

It is thus an object of the present invention to provide a self supporting cat scratching device which inherently presents a multitude of scratching surfaces enabling the device to last an extended period of time.

It is yet a further object of the present invention to provide a cat scratching device having a multitude of cat scratching surfaces which can differ from one another in order to maintain the engaging cat's interest in employing this device as a scratching medium.

These and further objects will be more readily apparent when considering the following disclosure and appended claims.

SUMMARY OF THE INVENTION

A cat scratching device for residing upon a substantially horizontal surface. The device includes three scratching posts each having first and second ends, the scratching posts being separated from one another at their first ends and joined to one another at their second ends resulting in a three-legged self supporting device. Each of the three scratching posts have scratching surfaces applied thereto.

DETAILED DESCRIPTION OF THE INVENTION

Figure 1:
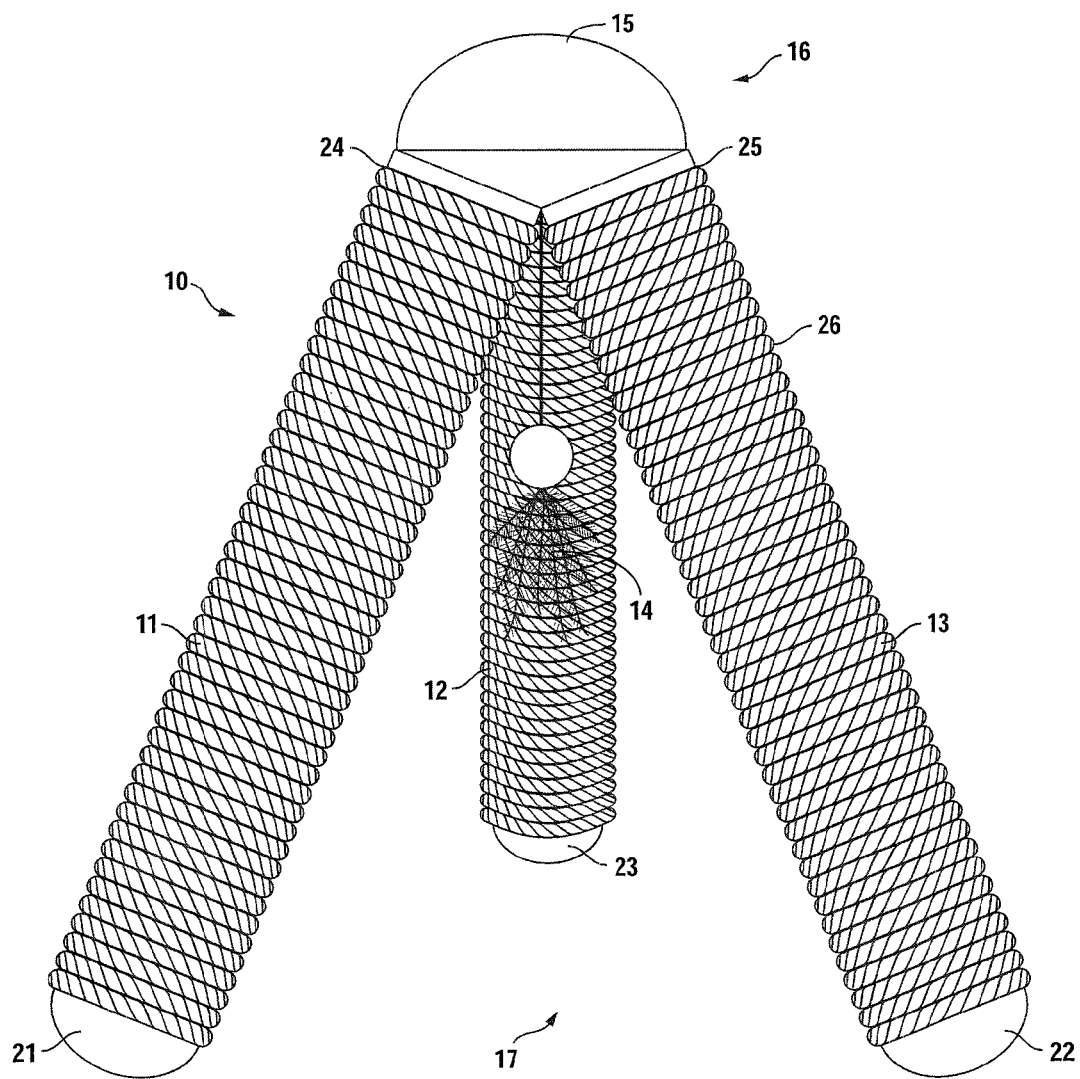
FIG. 1 is a perspective view of a first embodiment of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Turning to FIG. 1, cat scratching device 10 is depicted for residing upon a substantially horizontal surface. The device comprises three scratching posts 11, 12 and 13 each having first and second ends. First ends 21, 22 and 23 are separated creating space 17 directly below and within the structure. Scratching posts 11, 12 and 13 are joined to one another at ends 24, 25 and 26 in area 16 forming an apex preferably covered with pad 15 to provide a surface which would not represent a hazard to an engaging cat.

As a further preferred embodiment, a pet attractant toy, such as feathered toy 14 can be suspended from the apex of scratching device 10. Thus, an engaging cat can not only find amusement in scratching the surfaces of posts 11, 12 and 13 but also can sit within space 17 surrounded by scratching posts and swat at toy 14 while further receiving a sense of seclusion and isolation considered to be beneficial and necessary to maintain the well being of any domestic cat.

Figure 2:
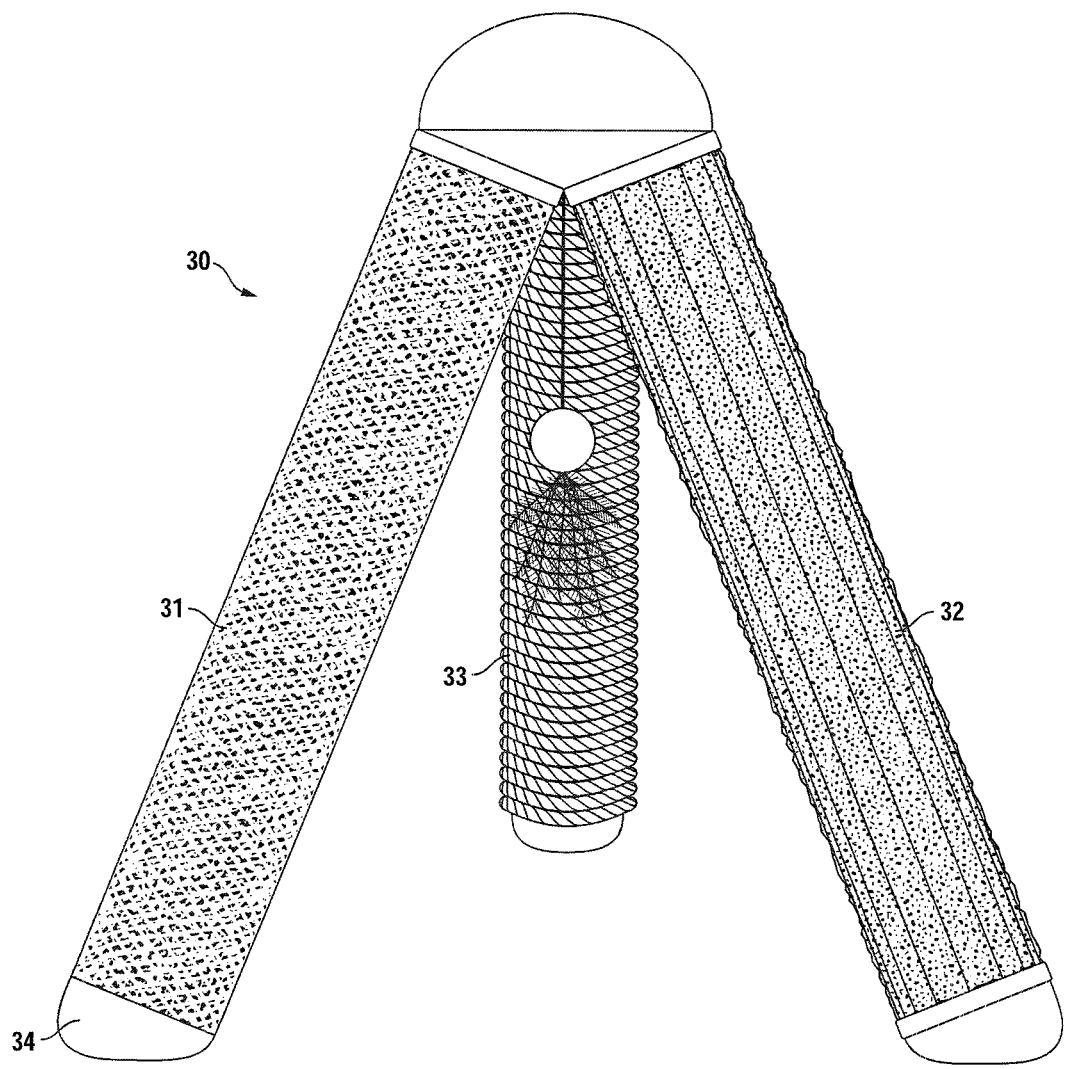
FIG. 2 is a perspective view of a second embodiment of the present invention.

As further noted in reference to FIG. 1, in this iteration, posts 11, 12 and 13 are clad with the same scratching surfaces, namely, surfaces composed of rope. Reference is made to FIG. 2 in order to gain further appreciation of the flexibility of the present invention above those attributes associated with scratching posts of the prior art.

It should be readily apparent that being a three legged structure, the present cat scratching device is extremely stable and would be difficult to tip and dislodge. As preferred embodiments, slip resistant feet 34 can be applied to each of the posts to further enhance stability. The present device, however, can employ any number of scratching surfaces comprising members selected from the group consisting of carpet, sisal, rope and seagrass. As to FIG. 2, scratching post 31 is shown covered with sisal, post 32 being covered with carpet while post 33 is covered with seagrass rope. Broadly, cat scratching device 30 contemplates an embodiment wherein one of the scratching surfaces on one of the posts differs from at least one of the scratching surfaces on the other of the posts. Within that characterization, it is noted that, as with the case of cat scratching device 30, each cat scratching post can be covered by a scratching surface that differs from the scratching surfaces on the other posts.

There are certain inherent advantages in practicing the present invention. Besides the recognition that the present device is extremely stable when placed upon a horizontal surface and that it can provide an area of seclusion comforting to most cats, because of the multitude of scratching surfaces, no one scratching surface should deteriorate more rapidly than others thus extending the overall life of the present device. Further, in that each post can have its own unique scratching surface, the device would enhance ongoing engagement by reducing boredom that a single scratching surface might represent. Finally, certain pet cats have been found to prefer certain scratching surfaces over others. The present device will assist in providing the pet owner with such feedback enabling this device to be customized to the pet's specific needs and desires.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat scratching device for residing upon a substantially horizontal surface, said device comprising three scratching posts each having first and second ends, said scratching posts being separated from one another at their first ends and joined to one another at their second ends resulting in a three-legged self supporting device, each of said three scratching posts having scratching surfaces applied thereto, and wherein one of said scratching surfaces on one of said scratching posts differs from at least one of the scratching surfaces on other of said scratching posts.

2. The cat scratching device of claim 1 wherein said three scratching posts reside upon said substantially horizontal surface at their first ends and join at their second ends forming an apex.

3. The cat scratching device of claim 2 wherein said apex is covered with a pad.

4. The cat scratching device further comprising a cat attractant toy suspended from said apex.

5. The cat scratching device of claim 2 wherein said scratching surfaces comprise a member selected from the group consisting of carpet, sisal, rope and seagrass.

6. The cat scratching device of claim 5 wherein each scratching post is covered by a scratching surface that differs from scratching surfaces on the other scratching posts.

* * * * *